Aug. 4, 1936. H. LACKEY 2,049,741
MEANS FOR THE RECOVERY OF PRECIOUS METALS FROM ORE
Filed Sept. 2, 1933 3 Sheets-Sheet 1
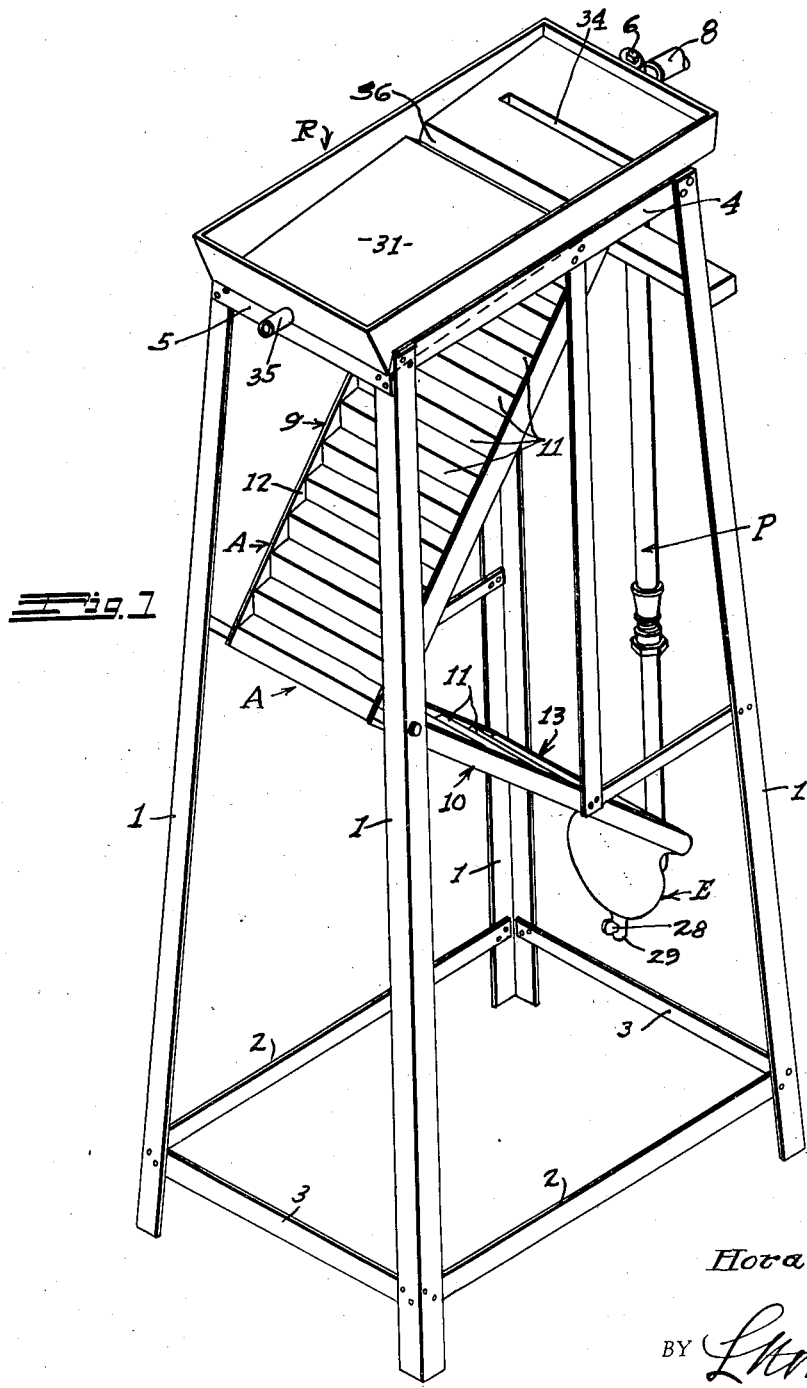
Horace Lackey,
INVENTOR.
BY
ATTORNEY.

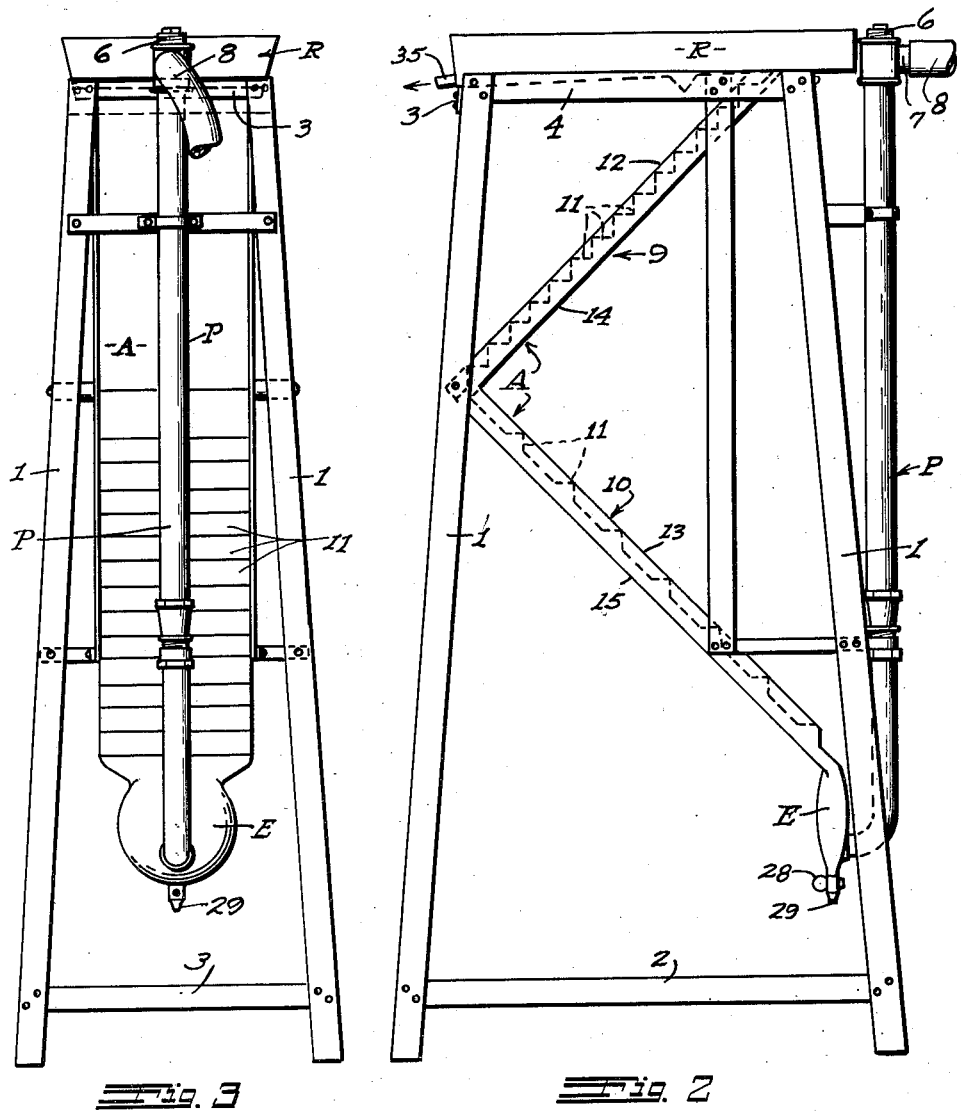

Aug. 4, 1936.　　　　　H. LACKEY　　　　　2,049,741
MEANS FOR THE RECOVERY OF PRECIOUS METALS FROM ORE
Filed Sept. 2, 1933　　　3 Sheets-Sheet 3
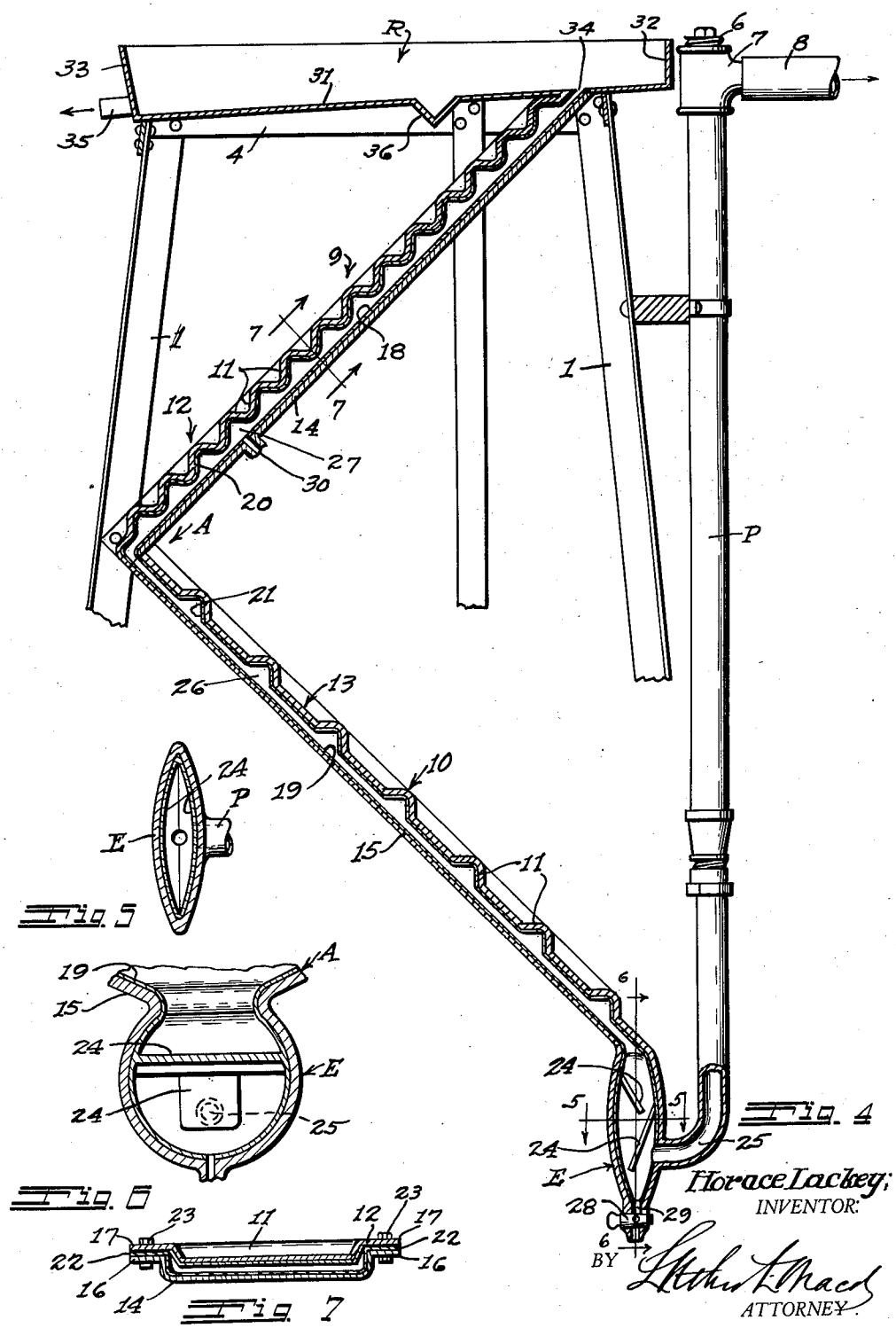
Horace Lackey,
INVENTOR
BY
ATTORNEY Patented Aug. 4, 1936

2,049,741

UNITED STATES PATENT OFFICE 2,049,741

MEANS FOR THE RECOVERY OF PRECIOUS METALS FROM ORE

Horace Lackey, Los Angeles, Calif., assignor to Wallace A. Burton, Los Angeles, Calif.

Application September 2, 1933, Serial No. 687,925

2 Claims. (Cl. 209—183)

This invention relates in general to and has for an object the extraction and recovery of precious metals, particularly gold, from native ores by a process of amalgamation in a substantial volume of mercury thru which the pulp from the pulp mill is pumped and the mercury and pulp are constantly agitated by the impingement thereof on corrugations or the like formed on or attached to the walls of a shallow receptacle which contains the mercury; thereby causing a rolling motion of the particles of pulp and gold during the course of the pulp thru the mercury. The ore having been previously treated by chemicals for separating the gangue from the gold particles and mixed with a sufficient proportion of water, the rolling motion of the particles in their progress thru the volume of mercury brings all facets and portions of the surfaces of the metal into intimate contact with the mercury by reason of which the gold becomes amalgamated in the mercury while the residue is forced thru the volume of mercury and is disposed of by suitable means for further treatment, assays or tests.

I have found that by providing a shallow receptacle with at least one of the sides thereof formed with corrugations and the opposite side with a plane amalgamating surface on its inner side, a volume of mercury which is the equivalent in weight of a head of water of twenty-six feet will, when fluid pressure is applied thereto, satisfactorily meet the requirements of complete amalgamation of the finely divided gold which is otherwise undiscernible and unrecoverable.

I prefer to arrange the receptacle containing the mercury in an inclined plane with a flat bottom and a corrugated top, each of which portions is provided with a lining of copper, plated in the usual manner with silver and providing amalgamating surfaces in direct contact with the mercury. At the bottom of the receptacle I provide a baffled expansion chamber to which is connected a pipe leading to a pump thru which the pulp is pumped thru the expansion chamber and thence thru the amalgamating chamber. The corrugations on the tops of the amalgamating chamber resist the movement of the mercury and cause a rolling motion thereof, while the particles of residue are caused to move in stages, from corrugation to corrugation steadily, and are finally expelled from the mercury while the gold is amalgamated in the mercury.

The provision of the amalgamating linings facilitates the amalgamating process by the collection of the finely divided gold particles thereon and from which the accumulated gold may be removed by scraping or otherwise, as in other amalgamating processes. The corrugations on a wall of the amalgamating chamber break up the column of water and pulp and distribute these elements evenly thruout the volume of mercury. The plane amalgamating surface of the lower plate of the amalgamator prevents the deposition of heavy gangue or other material which would tend to choke the amalgamator and prevent the ready flow of material thru the mercury, whereas the corrugated upper plate of the amalgamator causes the pulp to progress upwardly thru the amalgamator with a rolling movement rather than by violent agitation of the mercury. Such a movement of the pulp tends to resubmerge the pulp at each of the corrugations, thereby preventing the pulp from riding the upper surface of the mercury.

The submergence of the pulp in the mercury under pressure brings the entire body of the pulp carrying the gold or other values into intimate contact with the mercury, and the pulp, having been previously finely ground, chemically treated and agitated for the purpose of cleaning it, the gold content thereof is readily separated from the gangue and amalgamated. The mercury is then drawn from the amalgamator and retorted in the usual way for extracting the gold therefrom and the residue may be further treated for the extraction of other values therefrom.

An object also is to provide an improved method and means for the extraction of precious metals from ore by the agitation of a mass of mercury thru the application of fluid pressure by means of which a pulp containing the metal in finely divided particles is moved thru the mercury, the residue expelled therefrom, and the finely divided particles of metal amalgamated in the mercury.

Another object is to provide in a method and apparatus as described the provision of means for submerging the amalgamating plates in a volume of mercury.

Other objects may appear as the description progresses.

In the accompanying drawings I have shown a preferred form of apparatus arranged for the purpose described and subject to modification within the scope of the appended claims without departing from the spirit thereof. In said drawings, Fig. 1 is a perspective view of an amalgamating unit embodying my improvements.

Fig. 2 is a side elevation thereof.

Fig. 3 is an end elevation thereof.

Fig. 4 is an enlarged fragmentary sectional elevation of the amalgamator.

Fig. 5 is a sectional plan of the expansion chamber asociated with the amalgamator, on line 5—5 of Fig. 4.

Fig. 6 is a sectional elevation of the same on line 6—6 of Fig. 4.

Fig. 7 is a transverse section of the amalgamating receptacle on line 7—7 of Fig. 4, showing a slight modification of the form shown in Fig. 1.

The entire mechanism is mounted on a suitable frame which may be constructed as shown in the drawings or otherwise. Preferably the frame consists of a plurality of legs 1, 1 etc., connected at the bottom by means of longitudinal braces 2, 2 and transverse braces 3, 3, and at the top by corresponding braces 4, 4 and 5, 5.

At the top of the frame is mounted a receptacle R and below said receptacle an amalgamator A which terminates at its bottom in an expansion chamber E, said expansion chamber being connected with a pulp supply pipe P. The pipe P is preferably vertically disposed and has at its upper end a detachable plug 6 and a lateral nipple 7 to which a flexible tube 8 is connected for conveying pulp and water, as from a pulp mill, to the amalgamator. The amalgamator A is preferably disposed in an inclined plane and may include one or more sections, as at 9 and 10, in order to obtain the most satisfactory results.

The sections 9 and 10 are substantially similar and differ only in the direction in which they are inclined, and the number and character of the ribs or baffles, as at 11, 11 etc., which are formed on the upper plates 12 and 13 respectively of said sections.

As shown in Fig. 7, the amalgamating receptacle A is of shallow cross section, and includes a bottom plate, as at 14 and 15, formed of a pan-like cross section with a flat central bottom and laterally extended flanges 16, 16 on its opposite sides. The upper plates 12 and 13 are formed with corresponding flanges 17, 17 and a series of corrugations 11, 11 etc., of substantially V cross section, the number and arrangement of which may differ, as illustrated in the sections 9 and 10. In the upper section 9 the corrugations 11 are closely spaced at uniform pitch, while in the lower section the corrugations are preferably spaced at greater distances apart than in the upper section.

The bottoms 14 and 15 of the sections 9 and 10 are provided with amalgamating surfaces formed by lining said bottoms with copper plates 18 and 19, respectively, which are silver plated on their inner surfaces, thus providing smooth flat plane surfaces on the interior of both sections of the amalgamator. In like manner, it is preferable to provide similar linings of silver plated copper, as at 20 and 21, on the inner sides of the top plates 9 and 10 respectively.

In any event, it will be noted that the innermost portions of the corrugations 11 are but slightly spaced from the bottoms of the receptacle. The amalgamating receptacle, as shown in Fig. 4, may be formed of sheet metal, welded together at all joints and similarly connected with the expansion chamber E, or it may be formed, as shown in Fig. 7, of separable members arranged so that the bottoms of the sections 9 and 10 may be permanently attached to the frame members 1, 1 while the top plates 12 and 13 may be detachable therefrom in order to afford access to the interior of the receptacle as occasion may require.

In the latter event, suitable gaskets, as at 22, are interposed between the flanges 16 and 17 of the bottom and top members respectively, and said members may be secured together by means of bolts 23, so as to provide an air-proof and liquid-proof chamber within the two sections 9 and 10 of the amalgamator.

The expansion chamber E is attached to the bottom of the amalgamator or formed thereon, and provides a substantially circular receptacle with a plurality of inwardly formed angularly extended baffles 24, 24, preferably alternating in the direction of their inclination.

The lower end of pipe P is connected with the outer wall of the expansion chamber E so that pulp may enter from the passage 25 in the pipe near the bottom of the expansion chamber and will be deflected by the baffles 24, 24 therein permitting the expansion of the pulp so that it may more readily be forced upwardly thru a substantial volume of mercury which is contained in the chambers 26 and 27 of the sections 9 and 10 respectively.

The mercury is supplied to the amalgamator by removing the plug 6 from pipe P thru which it flows downwardly and rises in the chamber 26 of section 10 to approximately the level of the junction between chambers 26 and 27, but as pressure is applied to the bottom of the column of mercury the mercury will descend in the pipe P from its normal level to a median elevation in the expansion chamber E while the top of the column of mercury will rise in chamber 27 correspondingly to a point midway between the receptacle R and the lower extremity of section 9.

The bottom of the expansion chamber E is provided with a pet cock 28 which controls an outlet 29 thru which the contents of the chambers 26 and 27 may be drained at suitable intervals. Likewise an outlet 30 may be provided if desirable in the bottom of chamber 27 and closed similarly by means of a valve or cock.

It will be noted that the bottom 31 of receptacle R is slightly inclined from one end 32 to the opposite end 33 thereof and that chamber 27 is open at 34 to communication with said receptacle. The end 33 of the receptacle R has an outlet 35 thru which the residue from an amalgamating operation may be discharged to points of ultimate disposition or for further treatment.

The bottom 31 of the receptacle R has a transversely formed groove 36 which constitutes a trap for any particles of mercury which may be discharged from chamber 27 into the receptacle with the pulp.

In this connection it may be stated that it has been heretofore deemed impossible to agitate mercury because of the tendency of the metal to flour under agitation, thereby breaking it up into infinitesimal globules and requiring treatment to restore it to its normal state. I have found, however, that the agitation of a substantial volume of mercury by the application of fluid pressure, as at the bottom of a column of the metal, as for instance by forcing the fluid contained in the pulp thru the pipe P, results in but very little, if any, flouring of the mercury. This is due to the fact that when pressure is applied to the bottom of the column of mercury contained in the chambers 26 and 27 the corrugations 11 on the upper walls of the amalgamator effect a rolling and backward movement of the metal with its other constituents when pulp is being forced therethru, thereby creating a resistance to the expulsion of the mercury from the amalgamator, but so agitating it and displacing it at many different points that the pulp and water will gradually move thru the column of mercury upwardly in the chambers 26 and 27, and the residual elements will be discharged into the receptacle R while the valuable mineral constituents, particularly gold, will be amalgamated in the mercury.

As has been stated herein, the rolling movement of the mercury and the pulp adjacent each of the corrugations 11 in succession causes a rotation of all particles of matter resident in the mercury, thereby exposing all portions of the surfaces of the finely divided particles to the action of the mercury by reason of which the gold particles are amalgamated in the mercury while the gangue and residue are expelled thru the opening 34.

I contemplate, in the treatment of the pulp as herein described, to so thoroly clean the ore before introducing the same into the amalgamator that substantially all gangue and foreign matter will be separated from the particles of gold. In the event, however, that this preliminary treatment is not thoroly done prior to the amalgamating operation the agitation and movement of the particles in a step by step succession of movements thruout the length of the amalgamator is efficacious for more completely separating any foreign matter from the particles of valuable metal. Moreover, the continuous agitation of the particles of mineral in their movement thru the amalgamator bring a substantial quantity of mineral content of the pulp into contact with the amalgamating linings 18 and 19, and it will be apparent that the amalgamation of the finely divided particles, as of gold for instance, on the amalgamating plates 18 and 19 will be substantially beyond the possibility of the amalgamation of such particles, at least in such quantities, on the usual type of amalgamating plates which are not submerged in mercury and over which a volume of mercury is not sustained under agitation.

If for any reason due to the presence in the pulp of certain elements which may cause a certain amount of flouring the mercury content of the amalgamator, particles of the floured mercury will be collected in the trap 36 on the bottom of the receptacle R and may be thereby reclaimed for use after cleaning and separation of the foreign matter therefrom.

Under certain conditions and with certain kinds of ore, I may find it unnecessary to employ the two sections 9 and 10 in succession in the treatment of the ore, but may employ either one of said sections with either type of top plate 12 or 13 and with other forms and arrangements of the corrugations 11.

The provision of the expansion chamber E at the bottom of the amalgamator affords means whereby at the point of introducing the pulp to the volume of mercury the pulp is allowed to expand within a chamber of substantially greater area than the inlet passage 25, thereby enabling the pulp to more readily find its way thru the mercury under the pressure applied thru the pipe P.

What I claim is:

1. An amalgamator comprising a shallow receptacle formed with a plurality of oppositely inclined sections and provided with an inlet at the bottom of the lowermost section and an outlet at the top of the uppermost section, said lowermost section adapted to contain a volume of mercury, one of the walls of each of said sections having a plurality of corrugations formed thereon and the other wall of each section being flat and spaced from the corrugated wall so as to form eddies in the material as it is moved progressively into contact with said corrugations, means for feeding pulp containing ore to said outlet, and means for draining the residue from said outlet.

2. An amalgamator comprising a receptacle adapted to hold a volume of mercury and formed of a plurality of oppositely inclined connecting sections and provided with an inlet at the bottom of the lowermost section for receiving pulp containing ore, under pressure, and an outlet at the top of the uppermost section for discharging the residue, one of the walls of said receptacle being corrugated and an opposite wall thereof being relatively flat, whereby material in movement through the mercury is caused to eddy, and a receptacle adjacent said outlet for collecting particles of valuable constituents of the ore or the mercury subsequent to an amalgamating operation.

HORACE LACKEY.